US012572476B2

(12) United States Patent
Saleh et al.

(10) Patent No.: US 12,572,476 B2
(45) Date of Patent: Mar. 10, 2026

(54) GPU CHIPLETS USING HIGH BANDWIDTH CROSSLINKS

(71) Applicant: Onesta IP, LLC, Wayne, PA (US)

(72) Inventors: Skyler J. Saleh, San Diego, CA (US); Samuel Naffziger, Fort Collins, CO (US); Milind S. Bhagavat, Wayne, PA (US); Rahul Agarwal, Wayne, PA (US)

(73) Assignee: Onesta IP, LLC, Wayne, PA (US)

( * ) Notice: Subject to any disclaimer, the term of this patent is extended or adjusted under 35 U.S.C. 154(b) by 0 days.

(21) Appl. No.: 19/337,250

(22) Filed: Sep. 23, 2025

(65) Prior Publication Data

US 2026/0017205 A1     Jan. 15, 2026

Related U.S. Application Data

(63) Continuation of application No. 18/388,602, filed on Nov. 10, 2023, which is a continuation of application No. 16/456,287, filed on Jun. 28, 2019, now Pat. No. 11,841,803.

(51) Int. Cl.
| | |
|---|---|
| *G06F 12/08* | (2016.01) |
| *G06F 12/0897* | (2016.01) |
| *G06F 13/16* | (2006.01) |
| *G06F 13/40* | (2006.01) |

(52) U.S. Cl.
CPC ...... *G06F 12/0897* (2013.01); *G06F 13/1668* (2013.01); *G06F 13/4027* (2013.01); *G06F 2212/1024* (2013.01)

(58) Field of Classification Search
CPC ............. G06F 12/0897; G06F 13/1668; G06F 13/4027
See application file for complete search history.

(56) References Cited

U.S. PATENT DOCUMENTS

| | | | |
|---|---|---|---|
| 7,598,958 | B1 | 10/2009 | Kelleher |
| 7,633,505 | B1 | 12/2009 | Kelleher |
| 8,860,741 | B1 | 10/2014 | Juffa et al. |
| 9,170,948 | B2 | 10/2015 | Loh et al. |
| 10,282,811 | B2 | 5/2019 | Ray et al. |

(Continued)

FOREIGN PATENT DOCUMENTS

| | | |
|---|---|---|
| CN | 108694688 | 10/2018 |
| CN | 108732754 | 11/2018 |

(Continued)

OTHER PUBLICATIONS

Wong, W., Q&A: A Deeper Look at Marvell's MoChi Technology, Electronic Design, Jun. 6, 2016, 3 pgs.

(Continued)

*Primary Examiner* — Jae U Yu
(74) *Attorney, Agent, or Firm* — Volpe Koenig

(57) ABSTRACT

A chiplet system includes a central processing unit (CPU) communicably coupled to a first GPU chiplet of a GPU chiplet array. The GPU chiplet array includes the first GPU chiplet communicably coupled to the CPU via a bus and a second GPU chiplet communicably coupled to the first GPU chiplet via a passive crosslink. The passive crosslink is a passive interposer die dedicated for inter-chiplet communications and partitions systems-on-a-chip (SoC) functionality into smaller functional chiplet groupings.

29 Claims, 6 Drawing Sheets

(56) References Cited

U.S. PATENT DOCUMENTS

| | | |
|---|---|---|
| 10,475,147 B2 | 11/2019 | Price |
| 10,714,462 B2 | 7/2020 | Bhagavat et al. |
| 10,803,548 B2 | 10/2020 | Matam et al. |
| 10,909,652 B2 | 2/2021 | Koker et al. |
| 11,610,862 B2 | 3/2023 | Collins |
| 2001/0005873 A1 | 6/2001 | Yasuda |
| 2004/0003174 A1* | 1/2004 | Yamazaki ............. G06F 9/3851 712/E9.046 |
| 2007/0273699 A1 | 11/2007 | Sasaki et al. |
| 2009/0037658 A1 | 2/2009 | Sistla |
| 2011/0072213 A1 | 3/2011 | Nickolls et al. |
| 2011/0087864 A1 | 4/2011 | Duluk, Jr. et al. |
| 2012/0330802 A1 | 12/2012 | Guthrie et al. |
| 2013/0286034 A1 | 10/2013 | Diard |
| 2014/0001645 A1 | 1/2014 | Lin |
| 2014/0176187 A1 | 6/2014 | Jayasena et al. |
| 2015/0171015 A1 | 6/2015 | Mahajan et al. |
| 2015/0243528 A1 | 8/2015 | Whiting et al. |
| 2017/0062383 A1 | 3/2017 | Yee et al. |
| 2017/0236244 A1 | 8/2017 | Price et al. |
| 2017/0365580 A1 | 12/2017 | Shih et al. |
| 2018/0102251 A1 | 4/2018 | Delacruz et al. |
| 2018/0102338 A1 | 4/2018 | Mclellan |
| 2018/0130751 A1 | 5/2018 | Bower |
| 2018/0233470 A1 | 8/2018 | Killer et al. |
| 2018/0240778 A1 | 8/2018 | Liu |
| 2018/0246814 A1 | 8/2018 | Jayasena et al. |
| 2018/0293205 A1 | 10/2018 | Koker et al. |
| 2018/0300098 A1 | 10/2018 | Vembar et al. |
| 2018/0366436 A1 | 12/2018 | Wang et al. |
| 2019/0026228 A1 | 1/2019 | Jiang |
| 2019/0051633 A1 | 2/2019 | Bhagavat et al. |
| 2019/0089036 A1 | 3/2019 | Kamgaing et al. |
| 2019/0123022 A1 | 4/2019 | Teig et al. |
| 2019/0221556 A1 | 7/2019 | Gomes et al. |
| 2019/0245582 A1 | 8/2019 | Burton |
| 2020/0098724 A1 | 3/2020 | Liff et al. |
| 2020/0143506 A1 | 5/2020 | Xu |
| 2020/0176384 A1 | 6/2020 | Wu et al. |
| 2020/0294181 A1 | 9/2020 | Matam et al. |
| 2021/0020602 A1 | 1/2021 | Chen et al. |
| 2021/0097013 A1 | 4/2021 | Saleh et al. |
| 2021/0098419 A1 | 4/2021 | Saleh et al. |
| 2021/0158599 A1 | 5/2021 | Saleh et al. |

FOREIGN PATENT DOCUMENTS

| | | |
|---|---|---|
| EP | 3385848 | 10/2018 |
| EP | 3511980 | 7/2019 |
| EP | 2936554 B1 | 3/2021 |
| JP | 2011523745 | 12/2009 |
| JP | 2015524979 | 2/2014 |
| WO | 2012137339 | 10/2012 |
| WO | 2019032322 A1 | 2/2019 |
| WO | 2019132971 | 7/2019 |

OTHER PUBLICATIONS

"HBM vs GDDR5: HBM shortens your information commute" White paper, 1 pg.

"High-Bandwidth Memory (HBM)", white paper, downloaded from https://web.archive.org/web/20181019185554/http://www.amd.com/Documents/High-Bandwidth-Memory-HBM.pdf on Sep. 21, 2025, 1 pg.

Morgan, T. P., "AMD's Long Road From Naples to Milan Centers on Rome", The Next Platform, Nov. 6, 2018, 10 pgs.

AMD, "High Bandwidth Memory", website, https://web.archive.org/web/20181019185554/https:/www.amd.com/en/technologies/hbm, accessed Sep. 22, 2025, 22 pgs.

Office Action issued in Indian Application No. 202217015275 mailed Aug. 28, 2024, 5 pgs.

Office Action issued in U.S. Appl. No. 18/204,604, mailed Aug. 1, 2024, 11 pgs.

Japanese Office Action issued in Application No. 2022-516307, mailed Oct. 17, 2023, 4 pgs.

Notice of Allowance issued in U.S. Appl. No. 18/204,604, mailed Aug. 21, 2024, 11 pgs.

Office Action issued in Korean Application No. 10-2022-7011449, mailed Sep. 10, 2024, 7 pgs.

Office Action issued in U.S. Appl. No. 18/204,604, mailed Nov. 22, 2024, 11 pgs.

Office Action issued in U.S. Appl. No. 18/204,604, mailed Dec. 8, 2023, 11 pgs.

Office Action issued in Japanese Application No. 2022-517359, mailed Oct. 1, 2024, 3 pgs.

Office Action issued in Korean Application No. 10-2022-7012861, mailed Feb. 14, 2024, 3 pgs.

Beck et al., "Zeppelin': an SoC for Multichip Architecture," IEEE International 2015, 3 pgs.

Office Action issued in Indian Application No. 202117059190, mailed Oct. 9, 2023, 10 pgs.

Extended European Search Report issued in Application No. 20867435.8, mailed Oct. 10, 2023, 11 pgs.

Extended European Search Report issued in Application No. 20868658.4, mailed Sep. 27, 2023, 7 pgs.

Non-Final Office Action mailed Feb. 3, 2023 for U.S. Appl. No. 16/585,480, 19 pgs.

Office Action mailed Feb. 7, 2023 for Chinese Application No. 202080067194.0, 6 pgs.

Extended European Search Report issued in Application No. 20832015, mailed Jun. 22, 2023, 12 pgs.

Yin, J. et al., "Modular Routing Design for Chiplet-Based Systems," 2018 ACM/IEEE 45th Annual International Symposium on Computer Architecture (ISCA), IEEE, 2018, pp. 726-738.

International Preliminary Report on Patentability, mailed Mar. 15, 2022 for PCT/US2020/052433, 9 pgs.

Final Office Action mailed May 12, 2022 for U.S. Appl. No. 16/585,480, 21 pgs.

Notice of Allowance issued in U.S. Appl. No. 16/585,452, mailed Jul. 22, 2022, 7 pgs.

International Preliminary Report on Patentability, mailed Apr. 7, 2022 for PCT/US2020/052444, 8 pgs.

Non-Final Office Action issued Dec. 22, 2021 in U.S. Appl. No. 16/585,452, 11 pgs.

Non-Final Office Action issued Aug. 17, 2021 in U.S. Appl. No. 16/585,480, 20 pgs.

Final Office Action issued Jul. 30, 2021 in U.S. Appl. No. 16/585,452, 12 pgs.

Notice of Allowance issued Sep. 15, 2021 in U.S. Appl. No. 16/698,624, 18 pgs.

International Search Report and Written Opinion for Application No. PCT/US2020/039326, dated Oct. 13, 2020, 10 pgs.

Akhil Arunkumar et al., "MCM-GPU: Multi-Chip-Module GPUs for Continued Performance Scalability", downloaded from https://research.nvidia.com/sites/default/files/publications/ISCA_2017_MCMGPU.pdf on Jul. 17, 2025, 13 pgs.

Jieming Yin et al., "Modular Routing Design for Chiplet-based Systems", downloaded from https://www.eecg.utoronto.ca/~enright/modular-isca.pdf on Jul. 17, 2025, 13 pgs.

Notice of Allowance issued Jun. 10, 2021 in U.S. Appl. No. 16/698,624, 29 pgs.

International Preliminary Report on Patentability issued Dec. 28, 2021 for PCT/US20/039326, 6 pgs.

Non-Final Office Action issued Jan. 4, 2021 in U.S. Appl. No. 16/585,452, 25 pgs.

International Search Report and Written Opinion issued Dec. 30, 2020 in Application No. PCT/US2020/052433, 12 pgs.

Burd, Thomas, et al. "Zepplin': an SoC for Multichip Architectures", IEEE Journal of Solid-State Circuits, vol. 54, No. 1, Jan. 2019, pp. 133-143.

International Search Report and Written Opinion issued Dec. 30, 2020 in Application No. PCT/US2020/052444, 12 pgs.

Non-Final Office Action issued Nov. 13, 2020 in U.S. Appl. No. 16/698,624, 40 pgs.

Investor Relations, Marvell, "Marvell Releases New ARMADA Hyerscale Virtual SoC Families Featuring the ARM Cortex-A72

(56) References Cited

OTHER PUBLICATIONS

CPU With Advanced Networking and I/O Support", https://investor.marvell.com/2016-05-31-Marvell-Releases-New-ARMADA-Hyperscale-Virtual-SoC-Families-Featuring-the-ARM-Cortex-A72-CPU-with-Advanced-Networking-and-I-O-Support, May 31, 2016, 2 pgs.

Coskun, A., et al., "A Cross-Layer Methodology for Design and Optimization of Networks in 2.5D Systems", ICCAD '18, ACM, Nov. 2018, 8 pgs.

Vijayaraghavan, T., et al., "Desgn and Analysis of an APU for Exascale Computing", 2017 IEEE International Symposium on High Performance Computer Architecture, IEEE, 2017, 12 pgs.

Kannan, A., et al. "Enabling Interposer-based Disintegration of Multi-core Processors", 2015 48th Annual IEEE/ACM International Symposium on Microarchitecture, IEEE, 2015, 13 pgs.

Loh, et al., Interconnect-Memory Challenges for Multi-chip, Silicon Interposer Systems, MEMSYS '15, ACM, 2015, 8 pgs.

Jerger, N. E., et al, "NoC Architectures for Silicon Interposer Systems", 2014 47th Annual IEEE/ACM International Symposium on Microarchitecture, IEEE, 2014, 13 pgs.

Stow, D., et al., "Cost-Effective Design of Scalable High-Performance Systems Using Active and Passive Interposers", 2017 IEEE/ACM International Conference on Computer-Aided Design, IEEE, 2017, 8 pgs.

Lau, J., et al., "Redistribution Layers (RDLs) for 2.5D/3D IC Integration", Journal of Microelectronics and Electronic Packaging, International Microelectronics Assembly and Packaging Society, 2014, 9 pgs.

Teich, P., "The Heart of AMD's Epyc Comeback is Infinity Fabric", Jul. 12, 2017, 16 pgs., downloaded from https://www.nextplatform.com/2017/07/12/heart-amds-epyc-comeback-infinity-fabric on Aug. 28, 2025.

Mahajan, R., et al., "Embedded Multi-Die Interconnect Bridge (EMIB)—A High Density, High Bandwidth Packaging Interconnect", 2016 IEEE 66th Electronic Components and Technology Conference, IEEE, 2016, 9 pgs.

Chen, N.-C., "A Novel System in Package with Fan-out WLP for high speed SERDES application", 2016 IEEE 66th Electronic Components and Technology Conference, IEEE, 2016, 7pgs.

Gwennap, L., "Sutardja Sees Simpler SoCs", Microprocessor Report, The Linley Group, Jun. 2015, 5 pgs.

Hsu, H., "How Marvell FLC Redefines Main Memory", Marvell Blog Post, Apr. 25, 2016, downloaded from https://www.marvell.com/blogs/how-marvell-flc-redefines-main-memory.html on Aug. 28, 2025, 3 pgs.

Kanellos, M., "Chiplets Turn 10: Here are Ten Things to Know"; Marvell Blog Post, Aug. 13, 2025, downloaded from https://www.marvell.com/blogs/chiplets-turn-10-here-are-ten-things-to-know.html on Aug. 28, 2025, 6 pgs.

Lau, J. H. "Heterogeneous Integrations", Springer Nature Singapore Pte Ltd., 2019, 381 pgs.

"Marvell® ARMADA® 7040 Quad-Core CA72 Processor with Marvell MoChi" Product Brief, downloaded from https://www.marvell.com/content/dam/marvell/en/public-collateral/embedded-processors/marvell-embedded-processors-armada-7040-product-brief-2017-12.pdf, on Sep. 21, 2025, 3 pgs.

Revolutionary MoChi and FLC Architecture, downloaded from https://www.marvell.com/company/newsroom/marvell-introduces-industrys-first-hyper-scale-quad-arm-cortex-a72-and-dual-cortex-a53-based-chips-on-marvells-revolutionary-mochi-and-flc-architecture.html on Aug. 28, 2025, 4 pgs.

Merritt, R., "Marvell Debuts MoChi Chips", EE Times, Jun. 10, 2015, 5 pgs.

Morgan, T. P., "AMD Doubles Down—And Up—With Rome Epyc Server Chips", The Next Platform, Aug. 7, 2019, 18 pgs.

NVIDIA, "NVIDIA Tesla P100", GP100 Pascal Whitepaper, 45 pgs.

Oi, K., et al., "Development of New 2.5D Package with Novel Integrated Organic Interposer Substrate with Ultra-fine Wiring and High Density Bumps", 2014 Electronic Components & Technology Conference, IEEE, 2014, 6 pgs.

Saban, K., "Xilinx Stacked Silicon Interconnect Technology Delivers Breakthrough FPGA Capacity, Bandwidth, and Power Efficiency", Xilinx WP380 (v1.2) Dec. 11, 2012, 10 pgs.

Altera, "Stratix® 10 GX/SX Device Overview", Jun. 28, 2024, 39 pgs.

Altera, "Stratix® 10 TX Device Overview", Sep. 7, 2023, 39 pgs.

Alcorn, "Hot Chips 2017: Intel Deep Dives Into EMIB," available at www.tomshardware.com/news/intel-emib-interconnect-fpga-chiplet.35316.html (Aug. 25, 2017), 20 pgs.

AMD Communications, "Vega: AMD's New Graphics Architecture for Virtually Unlimited Workloads," (Jan. 5, 2017), 7 pgs.

AMD, "AMD Radeon (TM) R9 Nano, World's Smallest and Most Power-Efficient Enthusiast Graphics Card, Brings 4K Gaming to the Living Room," (Aug. 27, 2015), 3 pgs.

Balasubramonian et al., "Multi-Core Cache Hierarchies," Synthesis Lectures on Computer Architecture, Morgan & Claypool Publishers (2011), 155 pgs.

Deng et al., "2.5D System Integration: A Design Driven System Implementation Schema," IEEE (2004), 6 pgs.

Enquist, "Room Temperature Direct Wafer Bonding for Three Dimensional Integrated Sensors," Sensors and Materials, vol. 17, No. 6 (2005), 10 pgs.

Foley et al., "Ultra-Performance Pascal GPU and NVLink Interconnect," IEEE Computer Society, (2017), 11 pgs.

geeks3d.com, "AMD Radeon R9 Fury X Detailed (Spec, Slides, HBM, no HDMI 2.0 support . . . ," available ai www.geeks3d.com/20150618/amd-radeon-r9-fury-x-detailed-specs-slides-hbm-no-hdmi-2-0-support/ (Jun. 18, 2015), 9 pgs.

Ghaffarian et al., "Book of Knowledge (BOK) for NASA Electronic Packaging Roadmap," National Aeronautics and Space Administration, (2015), 54 pgs.

In the Matter of Certain Integrated Circuits, Elctronic Devices Containing the Same, and Components Thereof, Verified Complaint Under Section 337 of the Tariff Act of 1930, as amended, (Apr. 18, 2025), 73 pgs.

In the Matter of Certain Integrated Circuits, Electronic Devices Containing the Same, and Components Thereof, Amended Joint Proposed Claim Construction Chart, (Sep. 30, 2025), 29 pgs.

In the Matter of Certain Integrated Circuits, Electronic Devices Containing the Same, and Components Thereof, Complainant Onesta IP LLC's Preliminary Rebuttal to Nvidia's Invalidity Contentions, (Sep. 29, 2025), 110 pgs.

In the Matter of Certain Integrated Circuits, Electronic Devices Containing the Same, and Components Thereof, Nvidia's Supplemental Invalidity Contentions to Arunkumar et al., MCM-GPU: Multi-Chip-Module GPUs for Continued Performance Scalability, submitted as Exhibit 803-A-02, 337-TA-1450 (Nov. 20, 2025), 28 pgs.

In the Matter of Certain Integrated Circuits, Electronic Devices Containing the Same, and Components Thereof, Nvidia's Supplemental Invalidity Contentions to Coskun et al., A Cross-Layer Methodology for Design and Optimization of Networks in 2.5D Systems, submitted as Exhibit 803-A-03, 337-TA-1450 (Nov. 20, 2025), 59 pgs.

In the Matter of Certain Integrated Circuits, Electronic Devices Containing the Same, and Components Thereof, Nvidia's Supplemental Invalidity Contentions to U.S. Pat. No. 7,598,958, submitted as Exhibit 803-A-01, 337-TA-1450 (Nov. 20, 2025), 87 pgs.

In the Matter of Certain Integrated Circuits, Electronic Devices Containing the Same, and Components Thereof, Nvidia's Supplemental Invalidity Contentions to U.S. Pat. No. 11,610,862, submitted as Exhibit 803-A-05, 337-TA-1450 (Nov. 20, 2025), 110 pgs.

In the Matter of Certain Integrated Circuits, Electronic Devices Containing the Same, and Components Thereof, Nvidia's Supplemental Invalidity Contentions to Compilation of Disclosures from Additional Prior Art References, submitted as Exhibit 803-B, 337-TA-1450 (Nov. 20, 2025), 91 pgs.

In the Matter of Certain Integrated Circuits, Electronic Devices Containing the Same, and Components Thereof, Nvidia's Supplemental Invalidity Contentions to U.S. Pat. No. 10,909,652, submitted as Exhibit 803-A-04, 337-TA-1450 (Nov. 20, 2025), 115 pgs.

In the Matter of Certain Integrated Circuits, Electronic Devices Containing the Same, and Components Thereof, Nvidia's Supple-

(56) References Cited

OTHER PUBLICATIONS mental Invalidity Contentions to Stow et al., Cost-Effective Design of Scalable High-Performance Systems Using Active and Passive Interposers, submitted as Exhibit 803-A-12, 337-TA-1450 (Nov. 20, 2025), 66 pgs.
In the Matter of Certain Integrated Circuits, Electronic Devices Containing the Same, and Components Thereof, Nvidia's Supplemental Invalidity Contentions to Fan-out Mediatek Innovation Package, submitted as Exhibit 803-A-11, 337-TA-1450 (Nov. 20, 2025), 85 pgs.
In the Matter of Certain Integrated Circuits, Electronic Devices Containing the Same, and Components Thereof, Nvidia's Supplemental Invalidity Contentions to AMD's Implementation of HBM and/or Infinity Fabric, submitted as Exhibit 803-A-7, 337-TA-1450 (Nov. 20, 2025), 85 pgs.
In the Matter of Certain Integrated Circuits, Electronic Devices Containing the Same, and Components Thereof, Nvidia's Supplemental Invalidity Contentions to Vijayaraghavan et al., Design and Analysis of an APU for Exascale Computing, submitted as Exhibit 803-A-6, 337-TA-1450 (Nov. 20, 2025), 40 pgs.
Intel, "Intel Announces New Packaging and Test Technologies for Foundry Customers," (Aug. 27, 2014), 2 pgs.
Intel, "Intel Unveils Industry's First FPGA Integrated with High Bandwidth Memory Built for Acceleration," (2017), 5 pgs.
Marvell, "Marvell ARMADA 370 System-on-Chip (SoC) Family of Integrated Controllers," (2012), 2 pgs.
Marvell, "Marvell ARMADA 7020 Dual-Core CA72 Processor with Marvell MoChi and FLC Architecture," (2016), 2 pgs.
Marvell, "Marvell Expands Its 32-bit and 64-bit ARMADA SoC Family of Embedded Processors with Robust Ecosystem of Software Solutions and Partners for a Variety of Applications," (2016), 4 pgs.
McClanahan, "History and Evolution of GPU Architecture," (2010), 7 pgs.
Mearig et al., "An Overview of Manufacturing BGA Technology," International Electronics Manufacturing Technology Symposium (1995), 4 pgs.

Milic et al., "Beyond the Socket: NUMA-Aware GPUs," MICRO-50, Cambridge, MA, USA (Oct. 2017), 13 pgs.
Nayyar, "Performance Analysis of a Hierarchical, Cache-Coherent, Shared Memory Based, Multi-processor System," Disseratations and Theses (1993), 151 pgs.
Nvidia Corporation v. Onesta IP, LLC, Declaration of Dr. Vivek Subramanian regarding Claims 1-4, 7-10 of U.S. Pat. No. 11,841,803 (Oct. 15, 2025), 223 pgs.
Nvidia Corporation v. Onesta IP, LLC, Exhibit 19 to the Petition for Inter Partes Review, In the Matter of Certain Integrated Circuits, Electronic Devices Containing the Same, and Components Thereof, Inv. No. 337-TA-1450, (2025), 13 pgs.
Nvidia Corporation v. Onesta IP, LLC, Exhibit 50 to the Petition for Inter Partes Review, In the Matter of Certain Integrated Circuits, Electronic Devices Containing the Same, and Components Thereof, Inv. No. 337-TA-1450, (2025) 13 pgs.
Nvidia Corporation v. Onesta IP, LLC, Petition for Inter Partes Review of Claims 1-4 and 7-10 of U.S. Pat. No. 11,841,803 under 35 U.S.C. 312 and 37 C.F.R. 42.104, Case No. IPR2026-00011 (Oct. 15, 2025), 116 pgs.
ODSA Workgroup, "The Open Domain-Specific Architecture: A Chiplet-Based Open Architecture," Draft V0.9 (2018), 60 pgs.
Onesta IP, LLC, v. Nvidia Corporation, Onesta IP, LLC Complaint for Patent Infringement, C.A. No. 1:25-cv-586 (Apr. 17, 2025), 58 pgs.
Pirzada, "AMD's Infinity Fabric Detailed—the Innovative, Real-World Implementation of The Company's 'Perfect Lego' Philosophy," available at wccftech.com/amds-infinity-fabric-detailed (Jan. 16, 2017), 9 pgs.
Schaller, "Moore's Law: Past Present, and Future," IEEE Spectrum (Jun. 1997), 8 pgs.
Yazdani, "Design and Direct Assembly of 2.5D/3D Rigid Silicon Interposer on PCB," IMPAS Proceedings (Oct. 2014), 4 pgs.
Vijayaraghavan, T., et al., "Design and Analysis of an APU for Exascale Computing", 2017 IEEE International on High Performance Computer Architecture, IEEE, 2017, 12 pgs.

* cited by examiner

300

GPU CHIPLET 106-2

| WGP 302 | WGP 302 | WGP 302 |
| WGP 302 | WGP 302 | WGP 302 |
| GFX 304 | GFX 304 | GFX 304 |
| L1 306 | L1 306 | L1 306 |

GDF 314

| L2 308 | L2 308 | L2 308 | L2 308 |
| | L2 308 | L2 308 | |

SDF 316

| L3 310 | L3 310 | L3 310 |
| L3 310 | L3 310 | L3 310 |
| MEMORY PHY 312 | MEMORY PHY 312 | MEMORY PHY 312 |

GPU CHIPLET 106-1

| WGP 302 | WGP 302 | WGP 302 |
| WGP 302 | WGP 302 | WGP 302 |
| GFX 304 | GFX 304 | GFX 304 |
| L1 306 | L1 306 | L1 306 |

GDF 314

| L2 308 | L2 308 | L2 308 | L2 308 |
| | L2 308 | L2 308 | |

SDF 316

FROM CPU

| L3 310 | L3 310 | L3 310 |
| L3 310 | L3 310 | L3 310 |
| MEMORY PHY 312 | MEMORY PHY 312 | MEMORY PHY 312 |

HBX PASSIVE CROSSLINK 118

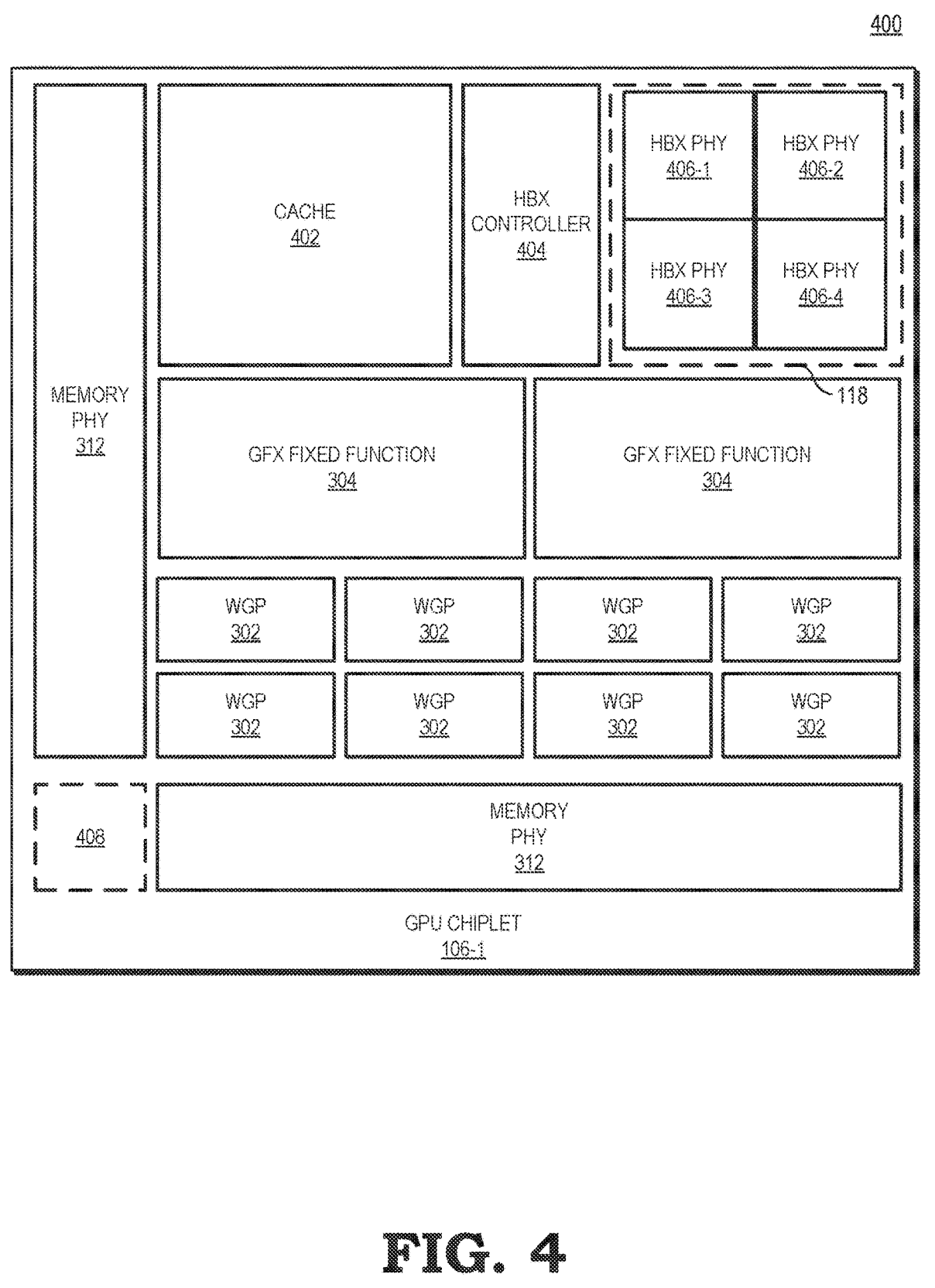

400

MEMORY PHY 312

CACHE 402

HBX CONTROLLER 404

HBX PHY 406-1

HBX PHY 406-2

HBX PHY 406-3

HBX PHY 406-4

118

GFX FIXED FUNCTION 304

GFX FIXED FUNCTION 304

WGP 302

WGP 302

WGP 302

WGP 302

WGP 302

WGP 302

WGP 302

WGP 302

408

MEMORY PHY 312

GPU CHIPLET 106-1

FIG. 4

GPU CHIPLETS USING HIGH BANDWIDTH CROSSLINKS

CROSS-REFERENCE TO RELATED APPLICATIONS

The present application is a Continuation Application of U.S. patent application Ser. No. 18/388,602, entitled "GPU CHPLETS USING HIGH BANDWIDTH CROSSLINKS", filed on Nov. 10, 2023, the entirety of which is incorporated by reference herein, which is a continuation of U.S. patent application Ser. No. 16/456,287, entitled "GPU CHIPLETS USING HIGH BANDWIDTH CROSSLINKS," filed on Jun. 28, 2019, the entirety of which is incorporated by reference herein.

BACKGROUND

Computing devices such as mobile phones, personal digital assistants (PDAs), digital cameras, portable players, gaming, and other devices requires the integration of more performance and features into increasingly smaller spaces. As a result, the density of processor dies and number of dies integrated within a single integrated circuit (IC) package have increased. Some conventional multi-chip modules include two or more semiconductor chips mounted side-by-side on a carrier substrate or in some cases on an interposer (so-called "2.5D") that is, in-turn, mounted on a carrier substrate.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 4 is a block diagram illustrating a floor plan view of a GPU chiplet in accordance with some embodiments.

DETAILED DESCRIPTION

Figure 1:
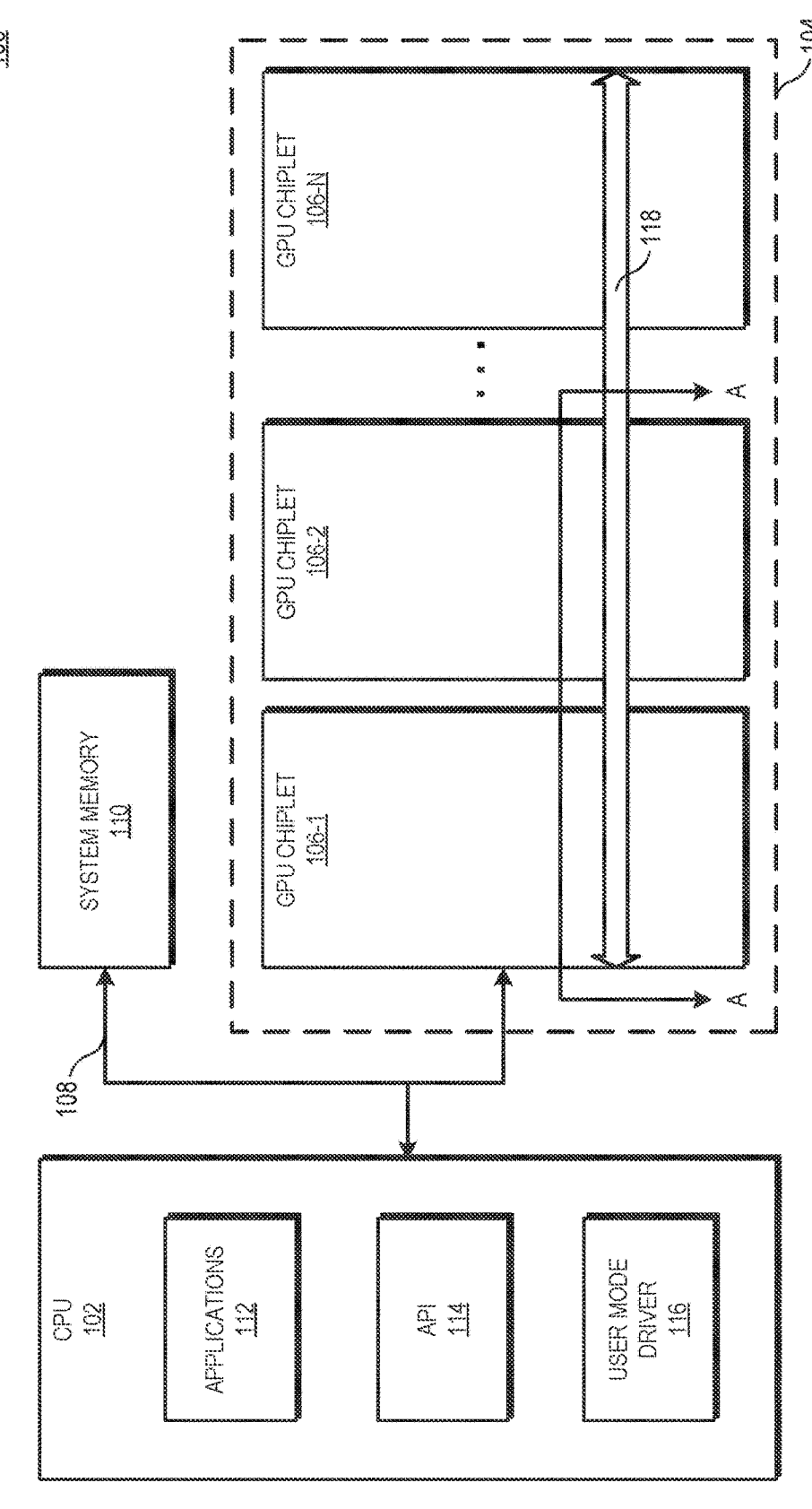
FIG. 1 is a block diagram illustrating a processing system employing high bandwidth passive crosslinks for coupling GPU chiplets in accordance with some embodiments.

Conventional monolithic die designs are becoming increasingly expensive to manufacture. Chiplets have been used successfully in CPU architectures to reduce cost of manufacture and improve yields, as its heterogeneous computational nature is more naturally suited to separate CPU cores into distinct units that do not require much inter-communication. GPU work by its nature includes parallel work. However, the geometry that a GPU processes includes not only sections of fully parallel work but also work that requires synchronous ordering between different sections.

Accordingly, a GPU programming model that spreads sections of work on different threads is often inefficient because the parallelism is difficult to distribute across multiple different working groups and chiplets as it is difficult and expensive computational to synchronize the memory contents of shared resources throughout the entire system to provide a coherent view of the memory to applications. Additionally, from a logical point of view, applications are written with the view that the system only has a single GPU. That is, even though a conventional GPU includes many GPU cores, applications are programmed as addressing a single device. So, it has been historically challenging to bring chiplet design methodology to GPU architectures.

To improve system performance by using GPU chiplets while preserving the current programming model, FIGS. 1-6 illustrate systems and methods that utilize high bandwidth passive crosslinks for coupling GPU chiplets. In various embodiments, a system includes a central processing unit (CPU) communicably coupled to a first graphics processing unit (GPU) chiplet of a GPU chiplet array. The GPU chiplet array includes the first GPU chiplet communicably coupled to the CPU via a bus and a second GPU chiplet communicably coupled to the first GPU chiplet via a passive crosslink. In various embodiments, the passive crosslink is a passive interposer die dedicated for inter-chiplet communications. The GPU chiplet breaks up systems-on-a-chip (SoC) into smaller functional groupings referred to as "chiplets" that perform functions of the various cores of the SoC (e.g., a GPU).

Currently, various architectures already have at least one level of cache (e.g., L3 or other last level cache (LLC)) that is coherent across the entire conventional GPU die. Here, the chiplet-based GPU architecture positions those physical resources (e.g., LLC) on different dies and communicably couples those physical resources such that the LLC level is unified and remains cache coherent across all GPU chiplets. Thus, although operating in a massively parallel environment, the L3 cache level to be coherent. During operations, a memory address request from the CPU to the GPU is transmitted only to a single GPU chiplet, which then communicates with a high bandwidth passive crosslink to locate the requested data. From the CPU's point of view, it appears to be addressing a single die, monolithic GPU. This allows for use of a large-capacity, multi-chiplet GPU that appears as a single device to an application.

FIG. 1 is a block diagram illustrating a processing system 100 employing high bandwidth passive crosslinks for coupling GPU chiplets in accordance with some embodiments. In the depicted example, the system 100 includes a central processing unit (CPU) 102 for executing instructions and an array 104 of one or more GPU chiplets, such as the three illustrated GPU chiplets 106-1, 106-2, and through 106-N (collectively, GPU chiplets 106). In various embodiments, and as used herein, the term "chiplet" refers to any device including, but is not limited to, the following characteristics: 1) a chiplet includes an active silicon die containing part of the computational logic used to solve a full problem (i.e., the computational workload is distributed across multiples of these active silicon dies); 2) chiplets are packaged together as a monolithic unit on the same substrate; and 3) the programming model preserves the concept that these separate computational dies are a single monolithic unit (i.e., each chiplet is not exposed as a separate device to an application that uses the chiplets for processing computational workloads).

In various embodiments, the CPU 102 is connected via a bus 108 to a system memory 110, such as a dynamic random access memory (DRAM). In various embodiments, the system memory 110 can also be implemented using other types of memory including static random access memory (SRAM), nonvolatile RAM, and the like. In the illustrated embodiment, the CPU 102 communicates with the system memory 110 and also the GPU chiplet 106-1 over bus 108 that is implemented as a peripheral component interconnect (PCI) bus, PCI-E bus, or other type of bus. However, some embodiments of the system 100 includes the GPU chiplet 106-1 communicating with the CPU 102 over a direct connection or via other buses, bridges, switches, routers, and the like.

As illustrated, the CPU 102 includes a number of processes, such as executing one or more application(s) 112 to generate graphic commands and a user mode driver 116 (or other drivers, such as a kernel mode driver). In various embodiments, the one or more applications 112 include applications that utilizes the functionality of the GPU chiplets 106, such as applications that generate work in the system 100 or an operating system (OS). An application 112 may include one or more graphics instructions that instruct the GPU chiplets 106 to render a graphical user interface (GUI) and/or a graphics scene. For example, the graphics instructions may include instructions that define a set of one or more graphics primitives to be rendered by the GPU chiplets 106.

In some embodiments, the application 112 utilizes a graphics application programming interface (API) 114 to invoke a user mode driver 116 (or a similar GPU driver). User mode driver 116 issues one or more commands to the array 104 of one or more GPU chiplets for rendering one or more graphics primitives into displayable graphics images. Based on the graphics instructions issued by application 112 to the user mode driver 116, the user mode driver 116 formulates one or more graphics commands that specify one or more operations for GPU chiplets to perform for rendering graphics. In some embodiments, the user mode driver 116 is a part of the application 112 running on the CPU 102. For example, the user mode driver 116 may be part of a gaming application running on the CPU 102. Similarly, a kernel mode driver (not shown) may be part of an operating system running on the CPU 102.

In the depicted embodiment of FIG. 1, a passive crosslink 118 communicably couples the GPU chiplets 106 (i.e., GPU chiplets 106-1 through 106-N) to each other. Although three GPU chiplets 106 are shown in FIG. 1, the number of GPU chiplets in the chiplet array 104 is a matter of design choice and may vary in other embodiments, such as described in more detail below. In various embodiments, the passive crosslink 118 includes an interconnect chip such as a high density crosslink (HDCL) die interposer or other similar technology for inter-chiplet communications. As a general operational overview, the CPU 102 is communicably coupled to a single GPU chiplet (i.e., GPU chiplet 106-1) through the bus 108. CPU-to-GPU transactions or communications from the CPU 102 to the array 104 of chiplets 106 is received at the GPU chiplet 106-1. Subsequently, any inter-chiplet communications is routed through the passive crosslink 118 as appropriate to access memory channels on other GPU chiplets 106. In this manner, the GPU chiplet-based system 100 includes GPU chiplets 106 that are addressable as a single, monolithic GPU from a software developer's perspective (e.g., the CPU 102 and any associated applications/drivers are unaware of the chiplet-based architecture), and therefore avoids requiring any chiplet-specific considerations on the part of a programmer or developer.

4

Figure 2:
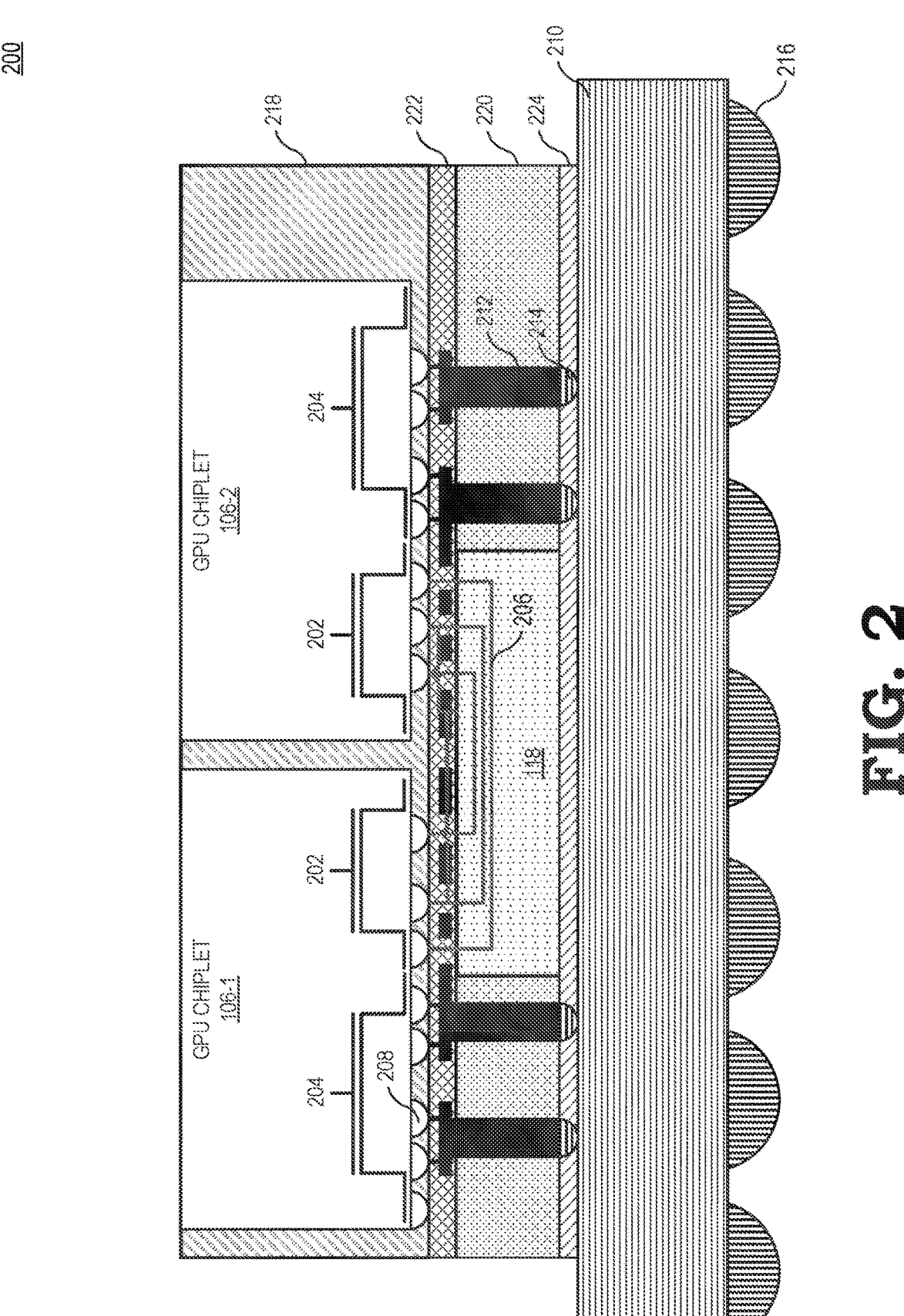
FIG. 2 is a block diagram illustrating a sectional view of GPU chiplets and passive crosslinks in accordance with some embodiments.

Additional details of the chiplet-based architecture may be understood with reference to FIG. 2, which is a block diagram illustrating a sectional view of GPU chiplets and passive crosslink in accordance with some embodiments. The view 200 provides a sectional view of GPU chiplets 106-1, 106-2, and passive crosslink 118 of FIG. 1 taken at section A-A. In various embodiments, each GPU chiplet 106 is constructed with a physical device (PHY) region 202, which has various internal and external conductor structures dedicated to the transmission of chiplet-to-chiplet signals, and a non-PHY region 204, which has conductor structures that are tailored more to the conveyance of power and ground and/or chiplet-to-circuit board signals.

As previously noted, the GPU chiplets 106 are communicably coupled by way of the passive crosslink 118. In various embodiments, the passive crosslink 118 is an interconnect chip constructed of silicon, germanium or other semiconductor materials and may be bulk semiconductor, semiconductor on insulator or other designs. The passive crosslink 118 includes a plurality of internal conductor traces, which may be on a single level or multiple levels as desired. Three of the traces are illustrated in FIG. 2 and labeled collectively as traces 206. The traces 206 interface electrically with conductor structures of the PHY regions 202 of the GPU chiplets 106 by way of conducting pathways. It is noted that the passive crosslink 118 does not contain any through silicon vias (TSVs). In this manner, the passive crosslink 118 is a passive interposer die that communicably couples and routes communications between the GPU chiplets 106, thereby forming a passive routing network.

The non-PHY regions 204 of the GPU chiplets 106 interface electrically with a circuit board 210 (or any other substrate) by way of a plurality of conductive pillars 212. Each conductive pillar 212 is connected electrically to the GPU chiplets 106 by way of a solder interconnect 208, which may include a solder bump, micro bump, and the like. In various embodiments, the circuit board 210 interfaces electrically with other electrical structure, such as another circuit board or other structures, by way of a plurality of interconnect structures 214 (e.g., solder balls and the like). However, those skilled in the art will appreciate that various types of interconnect structures such as pins, land grid array structures, other interconnects, and the like may be used without departing from the scope of this disclosure.

The conductive pillars 212 connect signals between the GPU chiplets 106 and the substrate in areas where the HDCL die is not present (e.g., areas with vertical discrepancy between the GPU chiplets 106 and the circuit board 210), with empty spaces filled with epoxy or other gap fill materials. In this manner, power and input/output (I/O) lines of the non-PHY regions 204 are routed around the interposer die (i.e., passive crosslink 118) using redistribution (RDL) technology, thereby replacing usage of conventional TSVs. For example, as illustrated in the embodiment of FIG. 2, the GPU chiplets 106 and passive crosslink 118 are at least partially encapsulated in a molding material, such as the two molding layers 218 and 220 of FIG. 2. The conductive pillars 212 traverse a plurality of insulating layers, such as the molding layer 220 and a polymer layer 222. In various embodiments, the polymer layer 222 is a RDL layer designed to act as a stress buffer and/or an isolation film for enabling redistribution layer routing. The conductive pillars 212 include various conductor materials, such as copper and the like. Similarly, the solder interconnects 208 and interconnect structures 214 include materials using various solder compositions, such as tin-silver, tin-silver-copper, and the like.

The circuit board 210 may include organic or ceramic and single, or more commonly, multilayer materials. To cushion against the effects of mismatched coefficients of thermal expansion, an underfill material 224 (e.g., polymeric underfill) may be positioned between the molding layer 220 and an upper surface of the circuit board 210. The underfill material 224 may extend laterally beyond the left and right edges (and other edges not visible in FIG. 2) of the molding layer 220 as desired.

Figure 3:
FIG. 3 is a block diagram illustrating a cache hierarchy of GPU chiplets coupled by a passive crosslink in accordance with some embodiments.

FIG. 3 is a block diagram illustrating a cache hierarchy of GPU chiplets coupled by a passive crosslink in accordance with some embodiments. The view 300 provides a hierarchical view of GPU chiplets 106-1, 106-2, and passive crosslink 118 of FIG. 1 Each of the GPU chiplets 106-1, 106-2 include a plurality of workgroup processors 302 (WGP) and a plurality of fixed function blocks 304 (GFX) that communicate with a given channel's L1 cache memory 306. Each GPU chiplet 106 also includes a plurality of L2 cache memory 308 banks that are individually accessible, a plurality of L3 cache memory 310 channels, and a plurality of memory PHY 312 (denoted as graphics double data rate (GDDR) in FIG. 3 for indicating connection to GDDR memory) channels mapped to the L3 channels. The L2 level of cache is coherent within a single chiplet and the L3 level (or other last level) of cache is unified and coherent across all of the GPU chiplets 106.

A graphics data fabric 314 (GDF) of each GPU chiplet 106 connects all of the L1 cache memories 306 to each of the channels of the L2 cache memory 308, thereby allowing each of the workgroup processors 302 and fixed function blocks 304 to access data stored in any bank of the L2 cache memory 308. Each GPU chiplet 106 also includes a scalable data fabric 316 (SDF) (also known as a SOC memory fabric) that routes across the graphics core (GC) and system on chip (SOC) IP cores to the passive crosslink 118. The GC includes CUs/WGPs, fixed function graphics blocks, caches above L3, and the like. Portions of the GPU used for traditional graphics and compute (i.e., the GC) are differentiable from other portions of the GPU used for handling auxiliary GPU functionality such as video decode, display output, and various system supporting structures that are contained on the same die. The passive crosslink 118 routes to both local L3 cache memory 310 of a chiplet (e.g., of GPU chiplet 106-1) and the L3 cache memory 310 of all other external GPU chiplets (e.g., GPU chiplet 106-2 in FIG. 3). In this manner, a memory address request is routed to the appropriate lanes on the passive crosslink 118 to access L3 cache memory 310 locally or at L3 cache memory 310 of a different GPU chiplet 106 (as discussed in more detail with respect to FIG. 5).

FIG. 4 is a block diagram illustrating a floor plan view of a GPU chiplet in accordance with some embodiments. The view 400 provides a floor plan view of GPU chiplet 106-1 of FIGS. 1 and 2. As previously described in more detail with respect to FIG. 3, the GPU chiplet 106-1 includes a plurality of workgroup processors 302 (WGP) and a plurality of fixed function blocks 304 (GFX). The GPU chiplet 106-1 also includes a hierarchical cache memory 402 (e.g., L1 cache memory 306, L2 cache memory 308, and L3 cache memory 310 of FIG. 3) and memory PHY 312. The GPU chiplet 106-1 further includes a passive crosslink controller 404 and one or more passive crosslink PHY tiles, such as the four illustrated passive crosslink PHYs 406-1, 406-2, 406-3, and 406-4 (collectively, passive crosslink PHYs 406), at a first corner (e.g., top-right corner of GPU chiplet 106-1 in FIG. 4).

The passive crosslink controller 404 connects to the last level cache (LLC) of the GPU chiplet 106-1 (e.g., L3 cache memory as discussed herein), and handles routing between the LLC and electrically-active portions of the logic of data fabric crossbars (e.g., SDF 316 of FIG. 3). The passive crosslink PHYs 406 (e.g., passive crosslink PHYs 406-1, 406-2, 406-3, and 406-4) include the wire transport of data across various GPU chiplets 106. In particular, the passive crosslink PHYs 406 correspond to traces 206 of FIG. 2 that form dedicated communication channels between GPU chiplets 106 that the GPU chiplet 106-1 interconnects with.

In various embodiments, passive crosslink PHY 406-1 corresponds to a dedicated communications channel that routes to the local L3 cache memory 310 of GPU chiplet 106-1. In contrast, passive crosslink PHY 406-2 corresponds to a dedicated communications channel that routes to the L3 cache memory 310 of an external GPU chiplet on a different chiplet die (e.g., GPU chiplet 106-2 of FIG. 1). That is, the dedicated communications channel of passive crosslink PHY 406-2 do not communicate with any chiplet other than GPU chiplet 106-2. Similarly, passive crosslink PHY 406-3, 406-4 correspond to dedicated communications channels that route to the L3 cache memory 310 of GPU chiplets 106-3 and 106-4, respectively. That is, the dedicated communications channels of passive crosslink PHY 406-3, 406-4 do not communicate with any chiplet other than GPU chiplets 106-3 and 106-4, respectively.

In some embodiments, the GPU chiplet 106-1 further includes an optional (as indicated by the dotted lines) second set of crosslink PHYs 408 at a second corner of the GPU chiplet 106-1 for communicating with additional GPU chiplets 106. The passive crosslink 118 thus operates as an extension cord between routing fabric of two or more dies and provides coherent L3 memory access with uniform memory access behavior (or mostly uniform memory access behavior). Those skilled in the art will recognize that the performance of a processing system generally scales linearly based on the number of GPU chiplets utilized by nature of physical duplication (e.g., as the number of GPU chiplets increases, so does the number of memory PHYs 312, WGPs 302, and the like).

Figure 5:
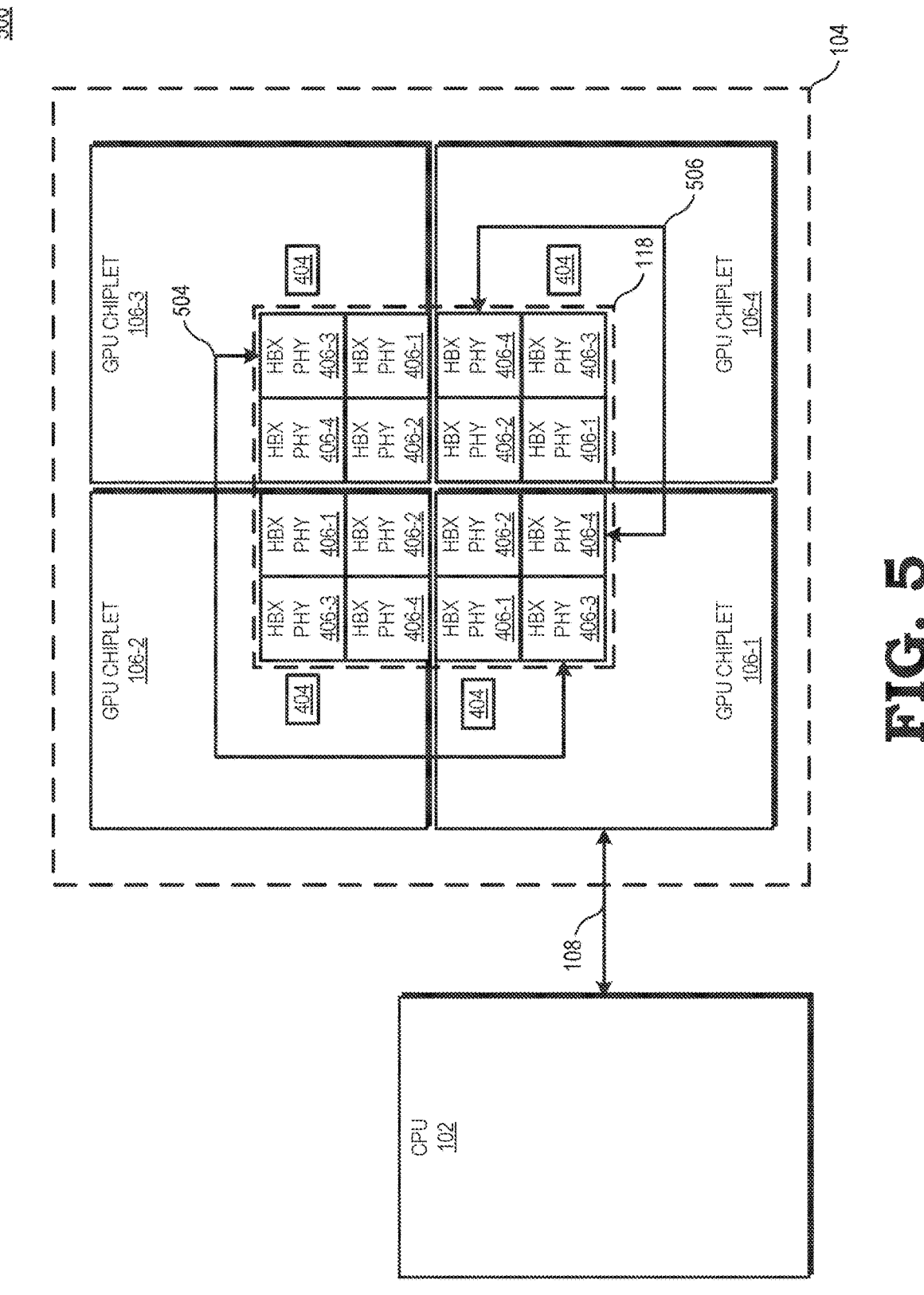
FIG. 5 is a block diagram illustrating a processing system utilizing a four-chiplet configuration in accordance with some embodiments.

Referring now to FIG. 5, illustrated is a block diagram of a processing system utilizing a four-chiplet configuration in accordance with some embodiments. The processing system 500 is similar to the processing system 100 of FIG. 1 but omits certain elements for ease of illustration. As illustrated, the system 500 includes the CPU 102 and four GPU chiplets, such as the illustrated GPU chiplets 106-1, 106-2, 106-3, and 106-4. The CPU 102 communicates with GPU chiplet 106-1 via the bus 108. With reference back to FIG. 4, the passive crosslink PHY 406-1 corresponds to a dedicated communications channel that routes to the local L3 cache memory 310 of GPU chiplet 106-1 (not shown). Passive crosslink PHY 406-2 corresponds to a dedicated communications channel that routes to the L3 cache memory 310 of GPU chiplet 106-2 (labeled as signal route 502 in FIG. 5). Passive crosslink PHY 406-3 corresponds to a dedicated communications channel that routes to the L3 cache memory 310 of GPU chiplet 106-3 (labeled as signal route 504 in FIG. 5). Passive crosslink PHY 406-4 corresponds to a dedicated communications channel that routes to the L3 cache memory 310 of GPU chiplet 106-4 (labeled as signal route 506 in FIG. 5).

As a general operational overview, the processing system 500 utilizes a master-slave topology in which a single GPU chiplet in direct communication with the CPU 102 (i.e., GPU chiplet 106-1) is designated as the master chiplet (hereinafter, primary GPU chiplet or host GPU chiplet). The other GPU chiplets communicate with the CPU 102 indirectly via the passive crosslink 118 and are designated as the slave chiplets (hereinafter, secondary GPU chiplet(s)). Accordingly, the primary GPU chiplet 106-1 serves as the singular entry point from the CPU 102 to the entire GPU chiplet array.

As illustrated in FIG. 5, in one example, the CPU 102 transmits an access request (e.g., read request) for memory address XYZ to the primary GPU chiplet 106-1. The passive crosslink controller 404 determines that data associated with memory address XYZ is cached in L3 cache memory 310 of secondary GPU chiplet 106-4. Based on that determination, the access request is routed via signal route 506 of the passive crosslink 118 to secondary GPU chiplet 106-4. The secondary GPU chiplet 106-4 returns the result back to primary GPU chiplet 106-1, which subsequently returns the requested data to the originating requestor (i.e., CPU 102). In this manner, the CPU 102 only has a single external view and does not require direct communications to two or more GPU chiplets 106 via bus 108.

Those skilled in the art will recognize that although FIG. 5 is described here in the specific context of square GPU chiplet dies and a corner positions for the passive crosslink, various other configurations, die shapes, and geometries may be utilized in various embodiments without departing from the scope of this disclosure. For example, in some embodiments, the GPU chiplets may be constructed as pentagon-shaped dies such that five GPU chiplets may be coupled together in a chiplet array. In other embodiments, GPU chiplets may include passive crosslinks at two or more corners of a square GPU chiplet (e.g., optional second set of crosslink PHYs 408 of FIG. 4) such that multiple GPU chiplets may be tiled together in a chiplet array. Similarly, in other embodiments, GPU chiplets may include passive crosslinks spanning an entire side of a square GPU chiplet such that multiple GPU chiplets may be strung together in a long row/column configuration to an intervening passive crosslink.

Figure 6:
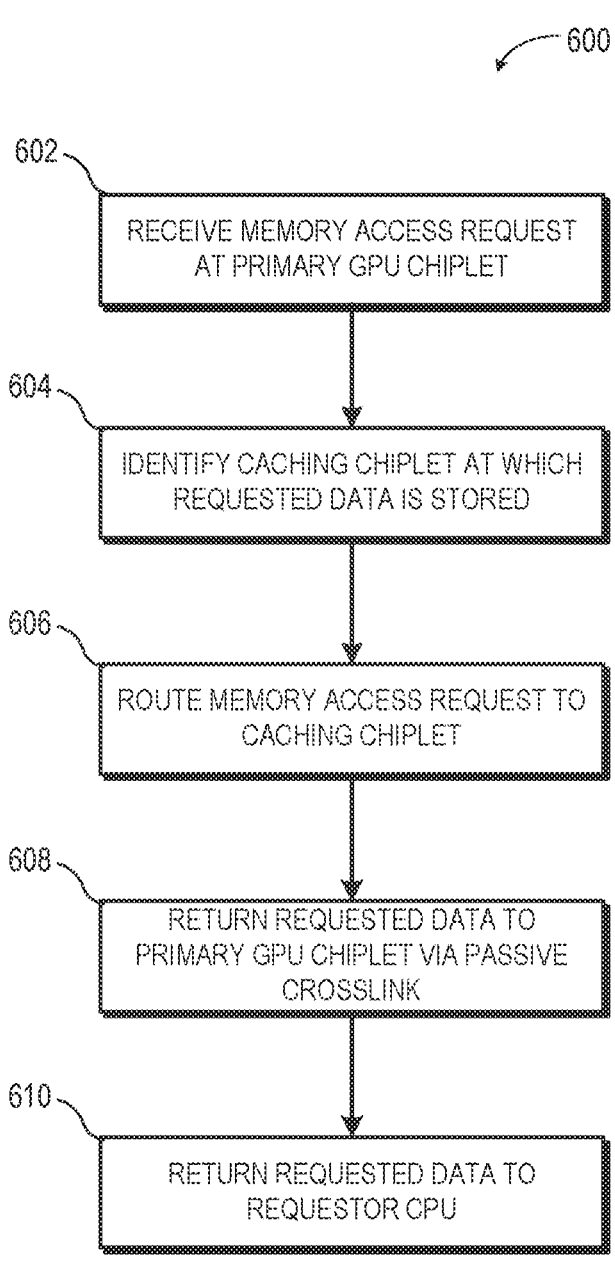
FIG. 6 is a flow diagram illustrating a method of performing inter-chiplet communications in accordance with some embodiments.

FIG. 6 is a flow diagram illustrating a method 600 of performing inter-chiplet communications in accordance with some embodiments. At block 602, a primary GPU chiplet of a GPU chiplet array receives a memory access request from a requesting CPU. For example, with reference to FIG. 5, the primary GPU chiplet 106-1 receives an access request for memory address XYZ from the CPU 102. In some embodiments, the primary GPU chiplet 106-1 receives the access request at its scalable data fabric 316 via the bus 108.

At block 604, the primary GPU chiplet 106-1 identifies a caching chiplet corresponding to the GPU chiplet at which the requested data is cached (also referred to interchangeably as the "secondary chiplet"). For example, with reference to FIG. 5, a passive crosslink controller 404 of the primary GPU chiplet 106-1 determines that data associated with memory address XYZ is cached in L3 cache memory 310 of secondary GPU chiplet 106-4. In some embodiments, the memory address range is address-sliced across the multiple GPU chiplets 106. In other embodiments, the processing system 100 utilizes other addressing topologies (e.g., flat address partitioning, addressing based on page settings from virtual to physical address translation, and the like). If the requesting data is not cached in the L3 of the secondary chiplet (i.e., the caching chiplet responsible for caching data associated with memory address XYZ), the memory access request is treated as an L3 miss and the secondary chiplet fetches the requested data from GDDR memory attached to that secondary chiplet.

At block 606, the primary GPU chiplet 106-1 routes the memory access request to the caching chiplet corresponding to the GPU chiplet at which the requested data is cached based on determination of block 604 and via the passive crosslink 118. For example, with reference to FIG. 5, the access request is routed via signal route 506 of the passive crosslink 118 to secondary GPU chiplet 106-4. In some embodiments, routing the memory access request includes the scalable data fabric 316 communicating with the passive crosslink 118, the scalable data fabric 316 requesting a data associated with the memory access request from the caching chiplet (e.g., secondary GPU chiplet 106-4).

In other embodiments, after determining that the requested data is cached locally at the L3 cache 310 of the primary GPU chiplet 106-1, the scalable data fabric 316 routes the access request via the passive crosslink 118 to the L3 cache 310 of the primary GPU chiplet 106-1. For example, with reference to FIG. 4, the scalable data fabric 316 routes the memory access request via passive crosslink PHY 406-1 corresponding to a dedicated communications channel between the local L3 cache memory 310 of GPU chiplet 106-1 and the passive crosslink 118.

At block 608, the caching chiplet returns data corresponding to the memory access request back to the primary GPU chiplet via the passive crosslink 118. For example, with reference to FIG. 5, the secondary GPU chiplet 106-4 returns the result back to primary GPU chiplet 106-1. In particular, the return communication is routed via the same signal route 506 of the passive crosslink 118 from which the memory access request was routed in block 606. Similarly, with reference to FIG. 4, the return communication is routed via passive crosslink PHY 406-1 corresponding to a dedicated communications channel between the local L3 cache memory 310 of GPU chiplet 106-1 and the passive crosslink 118 when the caching chiplet is the same as the primary GPU chiplet. In other embodiments, the request data port and the return data port do not share the same physical route.

At block 610, the primary GPU chiplet returns the requested data to the originating requestor (i.e., CPU 102) via the bus 108. In some embodiments, returning the requested data to the CPU 102 includes receiving the requested data from the caching chiplet at the scalable data fabric 316 of the primary GPU chiplet (i.e., GPU chiplet 106-1) and transmitting the requested data to the CPU 102 via bus 108.

Accordingly, as discussed herein, a passive die interposer deploys monolithic GPU functionality using a set of interconnected GPU chiplets in a manner that makes the chiplet implementation appear as a traditional monolithic GPU from a programmer model/developer perspective. The scalable data fabric of one GPU chiplet is able to access the lower level cache(s) on other GPU chiplets in nearly the same time as to access the lower level cache on its same chiplet, and thus allows the GPU chiplets to maintain cache coherency without requiring additional inter-chiplet coherency protocols. This low-latency, inter-chiplet cache coherency in turn enables the chiplet-based system to operate as a monolithic GPU from the software developer's perspective, and thus avoids chiplet-specific considerations on the part of a programmer or developer.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system, including a first processing unit that comprises a chiplet array, the chiplet array comprising:
a first chiplet that comprises a first plurality of parallel processors,
a second chiplet that comprises a second plurality of parallel processors, and
an interposer die including a plurality of internal conductor traces;
wherein:
the first chiplet, the second chiplet, and the interposer are included together in a monolithic integrated circuit package;
the first chiplet and the second chiplet are both connected to the plurality of internal conductor traces and the plurality of internal conductor traces are dedicated to communication between the first chiplet and the second chiplet;
the first chiplet is configured to interface with a second processing unit comprising a central processing unit ("CPU"); and
the second chiplet is configured to interface with the CPU via the first chiplet and the plurality of internal conductor traces.

2. The system of claim 1, further including a passive crosslink comprising the interposer die and the plurality of internal conductor traces.

3. The system of claim 2, where the interposer die does not include any through silicon vias (TSVs).

4. The system of claim 1, wherein the first plurality of parallel processors and the second plurality of parallel processors are capable of performing compute operations.

5. The system of claim 4, where the first processing unit is a graphics processing unit (GPU) and the first plurality of parallel processors and the second plurality of parallel processors are further capable of performing graphic operations.

6. The system of claim 1, wherein the first chiplet includes a first fixed function block and the second chiplet includes a second fixed function block.

7. The system of claim 6, where the first fixed function block and the second fixed function block are graphics fixed function blocks.

8. The system of claim 6, wherein the first chiplet includes circuitry separate from the first plurality of parallel processors and the first fixed function block capable of performing video decoding.

9. The system of claim 1, wherein:
the first chiplet includes a first data fabric and a first memory;
the second chiplet includes a second data fabric and a second memory;
the first data fabric and the second data fabric are capable of communicating over the plurality of internal conductor traces;
the first data fabric is capable of accessing the second memory over the plurality of internal conductor traces;
the second data fabric is capable of accessing the first memory over the plurality of internal conductor traces; and
the first data fabric and second data fabric are capable of maintaining coherency for the first memory and the second memory.

10. The system of claim 9, wherein the first memory and the second memory are part of a last level cache.

11. The system of claim 1, wherein:
the first chiplet includes a first cache memory and a second cache memory;
the second chiplet includes a third cache memory and a fourth cache memory;
the first cache memory is coherent across the first plurality of parallel processors;
the third cache memory is coherent across the second plurality of parallel processors; and
the second cache memory and the fourth cache memory are coherent across both the first plurality of parallel processors and the second plurality of parallel processors.

12. The system of claim 11, wherein:
the first processing unit includes a cache hierarchy comprising a first level and a second level;
the first level of the cache hierarchy includes the first cache memory and the third cache memory;
the second level of the cache hierarchy includes the second cache memory and the fourth cache memory;
the second level of the cache hierarchy is a last level cache.

13. The system of claim 1, wherein:
the first chiplet includes a first inter-chiplet physical device (PHY) region for communicating with the second chiplet and a first memory PHY region for communicating with a first memory device;
the second chiplet includes a second inter-chiplet PHY region for communicating with the first chiplet and a second memory PHY region for communicating with a second memory device;
the first inter-chiplet PHY region and second inter-chiplet PHY region interfaces electrically with the plurality of internal conductor traces.

14. The system of claim 13, wherein:
the monolithic integrated circuit package is mounted on a circuit board and has a bottom surface that is nearest the circuit board, a top surface opposite the bottom surface, a first side surface, and a second side surface opposite the first side surface;
the first chiplet and the second chiplet are disposed beneath the top surface;
the interposer die is disposed beneath the first chiplet and the second chiplet and above the bottom surface; and
the first inter-chiplet PHY region electrically interfaces with the plurality of internal conductor traces at the bottom surface of the first chiplet and the top surface of the interposer die; and
the second inter-chiplet PHY region electrically interfaces with the plurality of internal conductor traces at the bottom surface of the second chiplet and the top surface of the interposer die.

15. The system of claim 1, wherein the first processing unit is capable of using a programming model that spreads sections of work on different threads across the first chiplet and the second chiplet while maintaining synchronous ordering between the different threads.

16. The system of claim 1, wherein:
the first chiplet further includes a memory controller capable of receiving a memory access request from the CPU;
the memory access request is associated with data;
and the memory controller is capable of routing the memory access request to the first chiplet or the second chiplet.

17. The system of claim 16, wherein the memory access request references a memory address within a memory address range that is address-sliced across the first chiplet and the second chiplet.

18. The system of claim 16, wherein:
the first chiplet includes a first memory;
the second chiplet includes a second memory; and
the memory controller is capable of:
determining whether the data associated with the memory access request is located in the first memory or the second memory; and
routing the memory access request to the first chiplet or the second chiplet based on the determining of whether the data associated with the memory access request is located in the first memory or the second memory.

19. The system of claim 16, wherein:
the first chiplet includes a first cache memory;
the second chiplet includes a second cache memory; and
the memory controller is capable of:
identifying whether the first chiplet or the second chiplet is a caching chiplet for the data associated with the memory access request; and
routing the memory access request to the first chiplet or the second chiplet based on the identity of the caching chiplet.

20. The system of claim 19, wherein if the second chiplet is identified as the caching chiplet and the data associated with the memory access request is not present in the second cache memory, the memory access request is treated as a cache miss and the second chiplet fetches the data associated with the memory access request from a memory attached to the second chiplet.

21. The system of claim 1, wherein the chiplet array is a two-chiplet array consisting of the first chiplet, the second chiplet, and the interposer die.

22. The system of claim 1, wherein the first chiplet and the second chiplet include cache memories that together form at least a portion of a cache hierarchy.

23. The system of claim 22, wherein the cache hierarchy includes a first local hierarchy portion specific to the first chiplet, a second local hierarchy portion specific to the second chiplet, and a last level cache shared by and distributed between the first chiplet and the second chiplet.

24. The system of claim 23, wherein the interposer die is configured to communicate information for cache coherency requests between the first chiplet and the second chiplet.

25. The system of claim 1, wherein the interposer die is configured to communicate information for memory requests between the first chiplet and the second chiplet.

26. The system of claim 1, wherein the first chiplet is configured to accept memory access requests for data from the CPU and to route the memory requests to a chiplet other than the first chiplet depending on where the data resides.

27. The system of claim 1, wherein the interposer die only carries communications between the first chiplet and the second chiplet.

28. The system of claim 1, the chiplet array further comprising:
a third chiplet that comprises a third plurality of parallel processors; and
a fourth chiplet that comprises a fourth plurality of parallel processors;
wherein:
the third chiplet and the fourth chiplet are included in the monolithic integrated circuit package;

the third chiplet is configured to interface with the CPU via the first chiplet; and the fourth chiplet is configured to interface with the CPU via the first chiplet.

29. The system of claim 28, wherein the chiplet array is configured in a master-slave topology in which the first chiplet is designated as a master chiplet and the second chiplet, the third chiplet, and the fourth chiplet are designated as slave chiplets.

\* \* \* \* \*